US008650179B2

(12) United States Patent
Driesch, Jr. et al.

(10) Patent No.: US 8,650,179 B2
(45) Date of Patent: Feb. 11, 2014

(54) GENERATING STATISTICS FOR TEMPORARY TABLES DURING QUERY OPTIMIZATION

(75) Inventors: Robert Douglas Driesch, Jr., Rochester, MN (US); John Francis Edwards, Rochester, MN (US); Michael S. Faunce, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2142 days.

(21) Appl. No.: 11/207,055

(22) Filed: Aug. 18, 2005

(65) Prior Publication Data

US 2007/0043697 A1 Feb. 22, 2007

(51) Int. Cl.
*G06F 17/30* (2006.01)
*G06F 7/00* (2006.01)

(52) U.S. Cl.
USPC .............. 707/713; 707/725; 706/12; 706/13; 706/14

(58) Field of Classification Search
None
See application file for complete search history.

(56) References Cited

U.S. PATENT DOCUMENTS

| 6,275,818 | B1 * | 8/2001 | Subramanian et al. ............... 1/1 |
| 6,618,719 | B1 * | 9/2003 | Andrei ................................. 1/1 |
| 6,775,681 | B1 * | 8/2004 | Ballamkonda et al. ....... 707/718 |
| 6,882,993 | B1 * | 4/2005 | Lawande et al. .............. 707/714 |
| 7,213,012 | B2 * | 5/2007 | Jakobsson ........................ 707/2 |
| 7,430,562 | B1 * | 9/2008 | Bedell et al. ........................... 1/1 |
| 2003/0088579 | A1 * | 5/2003 | Brown et al. ............... 707/104.1 |
| 2004/0039729 | A1 * | 2/2004 | Boger et al. ...................... 707/2 |
| 2004/0225639 | A1 * | 11/2004 | Jakobsson et al. .............. 707/2 |
| 2004/0236762 | A1 * | 11/2004 | Chaudhuri et al. ........... 707/100 |
| 2005/0050041 | A1 * | 3/2005 | Galindo-Legaria et al. ...... 707/4 |
| 2005/0097078 | A1 * | 5/2005 | Lohman et al. ................... 707/2 |

* cited by examiner

*Primary Examiner* — Angelica Ruiz
(74) *Attorney, Agent, or Firm* — Wood, Herron & Evans LLP

(57) ABSTRACT

A method generates at least one statistic for a temporary table during optimization of a database query before the temporary table is created. By doing so, optimization can proceed on a database query irrespective of the fact that the temporary table may not be materialized until the database query is ultimately executed.

9 Claims, 3 Drawing Sheets

GENERATING STATISTICS FOR TEMPORARY TABLES DURING QUERY OPTIMIZATION

FIELD OF THE INVENTION

The invention relates to database management systems, and in particular, to the optimization of database queries by database management systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan, which typically incorporates low-level information telling the database engine that ultimately handles a query precisely what steps to take (and in what order) to execute the query. In addition, the access plan may select from different access methods (e.g., table scans or index accesses), based upon the available resources in the system.

A query optimizer typically creates multiple potential access plans, and selects the best among those potential access plans based upon the "cost" of each plan. The cost of each plan represents the amount of resources expected to be utilized by the plan (typically expressed in the expected amount of time to execute), and as such, selecting the plan with the lowest cost typically results in the most efficient (and quickest) execution of a query.

Typically, an optimizer may rely upon the statistical attributes or statistics of tables referenced in a database query to compare the access plans and identify the best plan under the runtime conditions. Statistical attributes may be, for example, the number of records in a table, the cardinality of a column of a table, selectivity of a predicate of the database query (i.e., expected number of records that will be returned based upon that predicate), etc. Statistical attributes are generally saved in physical tables and/or indexes thereof. Statistics are important during optimization because the optimizer typically uses the statistics to evaluate the cost of each access plan. For example, if a database query required a join operation between two tables, based upon an estimate of the number of records in each table to be a joined, an access plan where the table with the greater number of records is to the left of the join (or inner table) may carry a higher cost than a second access plan where the table with the greater number of records is to the right of the join (or outer table). Thus, when the table referenced in a database query is a physical table, the statistics saved in the physical table are generally used by the optimizer during optimization to cost the different access plans.

However, not all tables referenced in a database query are physical tables. As generally illustrated in FIG. 4, a user query 104 in a user application 106 may reference one or more physical table(s) 108 and/or logical table(s) 110. A logical table or logical file is generally a query packaged to look like a physical table or physical column. Although logical tables are generally not physical tables, logical tables are based upon physical tables. A logical table may be, for example, a SQL view, a SQL common table expression, a SQL subquery, a partition table, etc.

Logical tables also vary in complexity. Typically, the more groupings, unions, fetch first N rows, and/or other database functionality in a logical table (or query represented by a logical table), the higher the complexity of the logical table. Generally, complex logical tables (or queries represented by the complex logical tables) are materialized into a temporary table during execution of the database query referencing the logical table, and the temporary table may be used to generate the results of the database query (e.g., the temporary table may be joined to another table in the database query).

Logical tables may reference more logical tables to any depth (e.g., logical table1 references logical table2 which references logical table3 which references logical table4 and so forth), further increasing the complexity of a logical table. As illustrated in FIG. 4, logical table 110 may reference one or more physical table(s) 112 and/or logical table(s) 114. Similarly, logical table 114 may reference one or more physical tables and/or logical tables and so forth. Thus, result 116 of the user query may be based upon any number of physical and/or logical tables.

Optimizing database queries with less complex logical tables for which a temporary table does not need to be materialized may be done using conventional techniques (e.g., merging the logical table with the database query). However, optimizing a database query that references a logical table for which a temporary table needs to be materialized is often problematic. In particular, as temporary tables do not physically exist during optimization unlike physical tables, statistics are generally not available (and/or if available, are typically based upon an arbitrary guess). Therefore, in selecting an access plan, the optimizer is generally not able to consider the statistical attributes of any temporary table that will be materialized from the logical table. As a result, the optimizer may not be able to determine during optimization, for example, if an access plan that places the logical table to the left of a join costs more than an access plan that places the logical table to the right of a join as the optimizer generally will not have any statistical information such as the number of records the temporary table of the complex logical table will contain. Furthermore, as a logical table may reference additional tables (e.g. another logical table), for which additional temporary tables may need to be materialized during execution, the optimizer may not be able to consider the statistical attributes of these additional temporary tables either during optimization.

In an effort to optimize database queries that reference complex logical tables without statistics (or statistics based upon a guess) about a temporary table that will be materialized, the optimizer generally optimizes the database query as two separate queries (i.e., the database query is treated as one query and the query represented by the logical table is treated as another). However, as the optimizer typically does not have any statistical data about the temporary table that will be materialized from the logical table, the optimizer generally places the two queries together in a functional manner (e.g., arbitrarily placing the logical table to the right of a join), but not necessarily the best manner under the runtime conditions. Typically, this approach results in the selection of suboptimal access plans and poor performing database queries.

A need therefore exists for improving the optimization of database queries, in particular, improving the optimization of database queries that reference logical tables for which temporary tables will be created during the execution of the database queries, thus, resulting in improved selection of access plans and improved query performance.

BRIEF SUMMARY OF THE INVENTION

The invention addresses these and other problems associated with the prior art by providing an apparatus, program product and method that generate at least one statistic for a temporary table during optimization of a database query, and before the temporary table is created. By doing so, optimization can proceed on a database query irrespective of the fact that the temporary table may not be materialized until the database query is ultimately executed. Typically, the database query may be optimized with the generated statistic, often enabling a query optimizer to select an access plan to process the database query that is optimal under the runtime conditions and improved query performance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
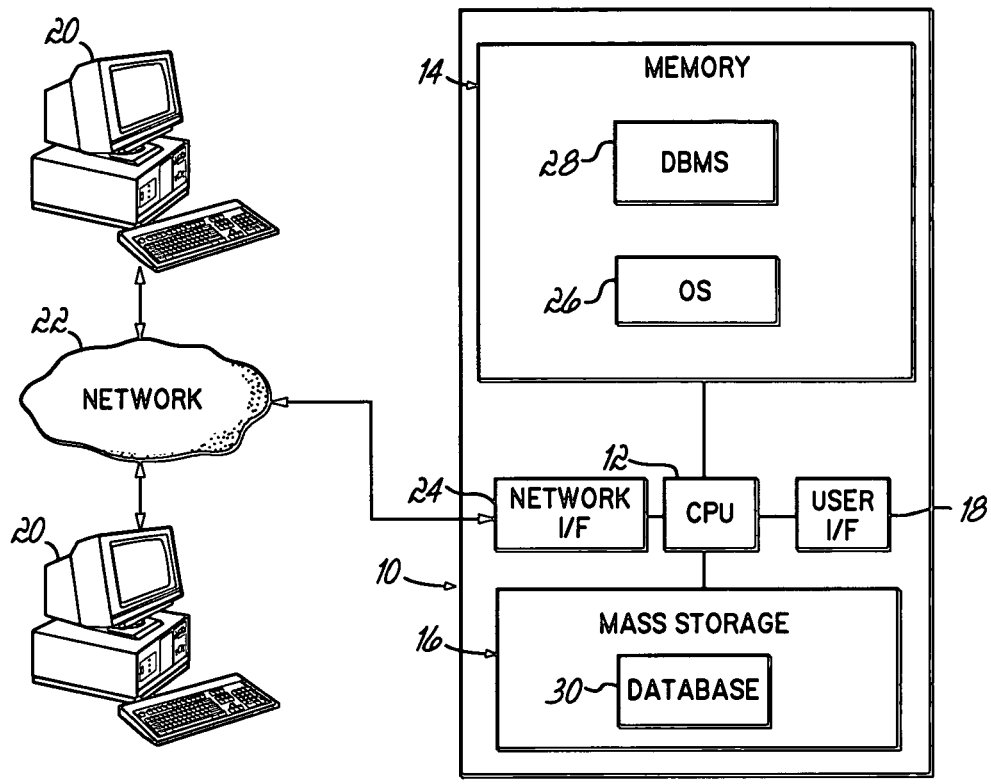
FIG. 1 is a block diagram of a networked computer system incorporating a database management system within which is implemented query optimization consistent with the invention.

The embodiments discussed hereinafter generate at least one statistic for a temporary table before the temporary table is created to optimize a database query, where at least one field will be materialized (i.e., cause to exist, generated, created, etc.) into the temporary table during the database query's execution. Thus, statistics may be generated during optimization for a temporary table that does not exist during optimization. A field consistent with the invention may be a single field in a table and/or a set of fields (e.g., a vertical set of fields commonly referred to as a column, a horizontal set of fields commonly referred to as a row or record, etc.) Embodiments consistent with the invention have applicability with practically any type of database query for which at least one field will be materialized into a temporary table during the database query's execution.

A field may be materialized into a temporary table when a temporary result is required to execute the database query, such as when a temporary result is needed to carry out an operation. For example, a temporary table may be materialized when a database query references a logical table or logical file such as, but not limited to a SQL view, a SQL common table expression, a SQL subquery, an index, a data description specification or DDS file, an optimizer identified query within the database query (e.g., the optimizer may divide the database query into steps of small queries), etc. involving database functionality such as, but not limited to groupings, first N rows, unions, unions alls, complex types of joins, subquery where the result differs depending on the value inputted into the subquery, etc. Thus, at least one field of a table referenced in the query represented by the logical table may have to be materialized into a temporary table, for example, the logical table (materialized into a temporary table) is joined with another table of the database query. Similarly, a field may be materialized when the logical table is at least one abstraction away from the physical tables, for example, the query represented by a logical table includes database functionality for which a temporary table needs to be materialized. A field may also be materialized when a logical table references at least one other logical table.

Furthermore, a temporary table may be materialized in its entirety during execution and/or a temporary table may be materialized in less than its entirety during execution consistent with the invention. For example, instead of materializing all records to be materialized into a temporary table at the same time, records may be selectively materialized (e.g., when needed) into a temporary table during execution.

Additionally, those of ordinary skill in the art will recognize that a field may be materialized into a temporary table during a database query's execution for other reasons as well. However, for convenience, the terms "logical table" and/or "logical tables" are used throughout the background, detailed description, and drawings, but the use of the terms "logical table" and/or "logical tables" is not meant to limit the scope of the present invention.

Turning now to the Drawings, wherein like numbers denote like parts throughout the several views, FIG. 1 illustrates an exemplary hardware and software environment for an apparatus 10 suitable for implementing a database management system incorporating query optimization consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
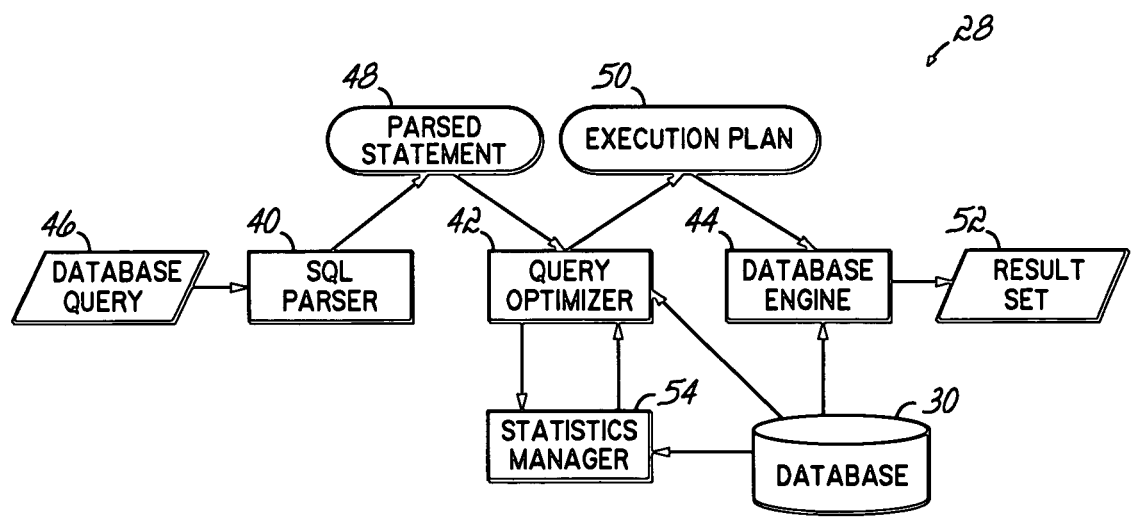
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

To facilitate the optimization of queries, the DBMS 28 may also include a statistics manager 54. Statistics manager 54 may be used to gather, create, and/or analyze statistical information using database 30 for query optimizer 42.

Generally, a DBMS consistent with the invention is capable of providing a query optimizer with statistical information about a temporary table before the temporary table is materialized from the fields of the logical table of a database query during the database query's execution. A statistic or estimate consistent with the invention may be practically any data that may assist in optimizing a database query such as, but not limited to selectivity of a predicate, a cardinality of a field, a number of records in a table, a number of distinct values, a number of records selected, a number of bytes (e.g., a number of bytes in a column, a number of bytes in more than one column, a number of bytes of all columns, a number of bytes of an entire temporary table, etc.), a frequent value list, a histogram, a distribution, etc. A statistic may also be a predicate, a record, a field, a value (e.g., an actual value in a table, etc.), etc.

Furthermore, to generate a statistic for the temporary table, the statistic may be generated based upon information already saved in a temporary table, access plan, and/or probing the physical table(s) the temporary table is based upon. Additionally, this may also include probing statistic(s) and/or index(es) of the physical table(s). Thus, a DBMS may retrieve and/or save statistics for the temporary table in a physical tables, temporary table, and/or access plan. Furthermore, a DBMS consistent with the invention may use predicates of the database query referencing the logical table as well as predicates from the query represented by the logical table to generate statistics. The generated statistic may be used to optimize the database query containing the logical table.

It will be appreciated by those of ordinary skill in the art, however, that optimizer 42, statistics manager 54, database 30, database engine 44, and/or other components may be accorded different functionality in some embodiments. Moreover, optimizer 42, statistics manager 54, database 30, database engine 44, and/or other components may be added and/or omitted in some embodiments. Those of ordinary skill in the art will also recognize that the exemplary implementation of DBMS 28 illustrated in FIG. 2 is not intended to limit the present invention. Indeed, those skilled in the art will recognize that other alternative hardware and/or software environments may be used without departing from the scope of the invention.

Figure 3:
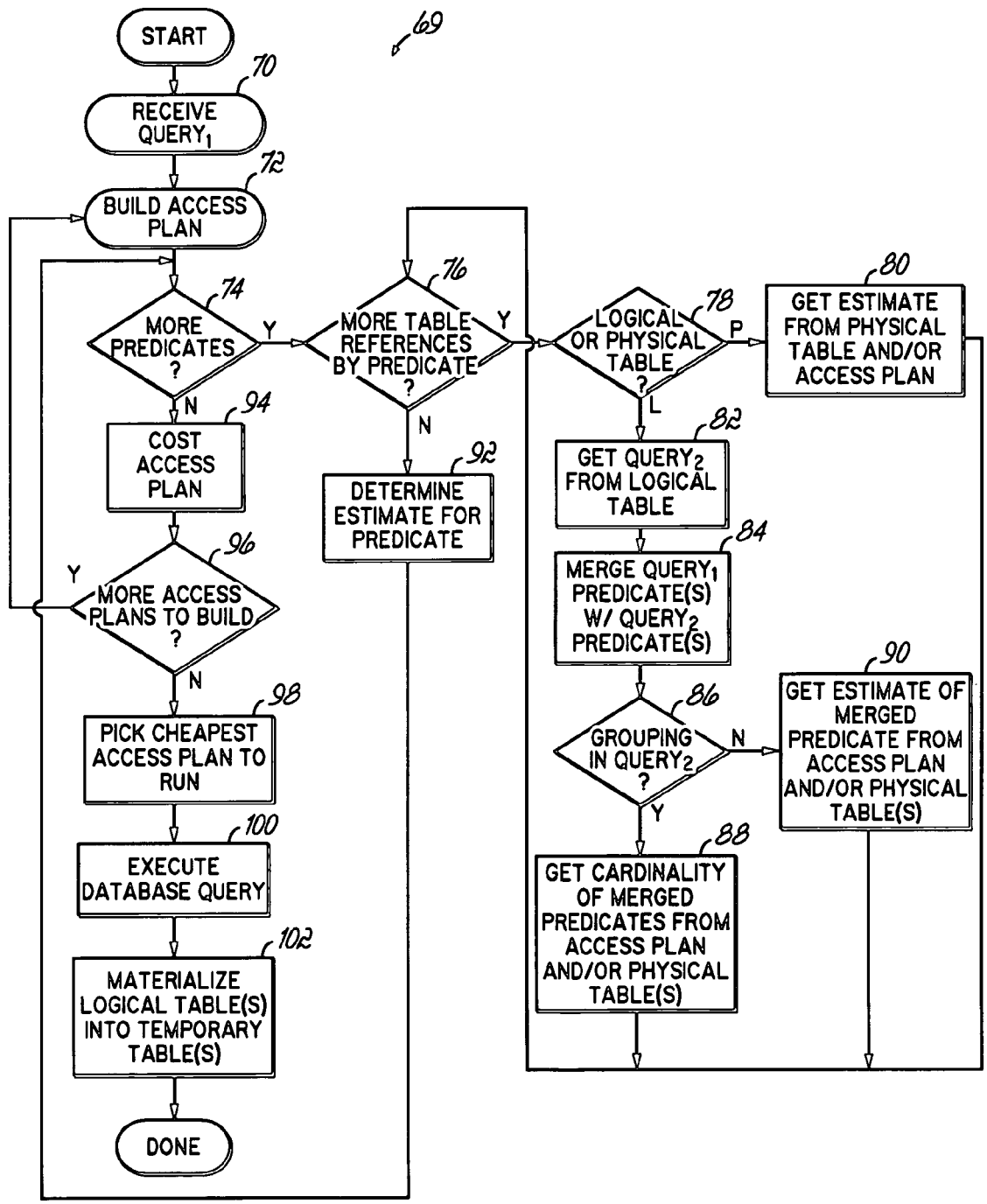
FIG. 3 is a flowchart illustrating the program flow of one implementation of a query optimization routine.
Figure 4:
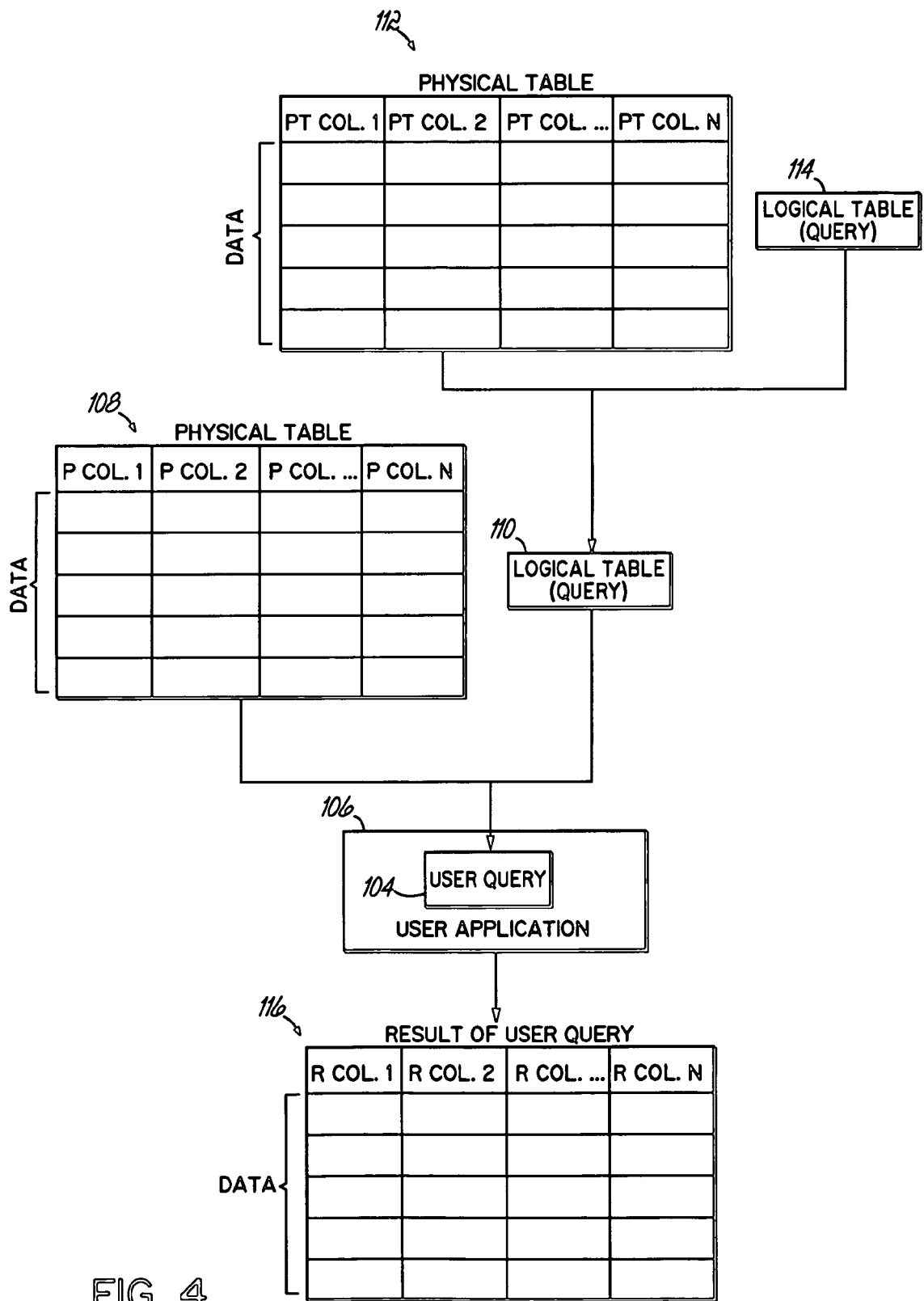
FIG. 4 is a block diagram illustrating exemplary physical and logical tables referenced by a database query.

Turning to FIG. 3, FIG. 3 illustrates a flowchart of an exemplary routine 69 for optimizing a database query with a statistic of a temporary table that will be materialized from a logical table of the database query during the database query's execution in accordance with the principles of the present invention. Starting with block 70, a database query1 is received (e.g., from a user application) by a DBMS for optimizing. Next, a first access plan is built for the received database query in block 72. The access plan may be built using any number of conventional techniques. Next, block 74 determines whether or not there are any more predicates (e.g., table1.field1=table2.field2) remaining to be processed. Generally, each predicate may affect the execution of a database query; therefore, each predicate may be evaluated during optimization. If there is a predicate remaining to be processed, control passes to block 76 to determine if there are any more table references to be processed for the predicate. A predicate may reference more than one table (e.g., a join predicate or predicate with a join operation may reference two tables); thus, if another table reference remains to be processed, control passes to block 78 where each table referenced in the predicate is processed individually.

Block 78 determines whether a table referenced in the predicate is a physical table or a logical table. Generally, a physical table contains the physical data, including statistics and indexes, and physically exists during optimization. A logical table, on the other hand, is a query packaged to look like a physical table and is based upon physical tables, but a logical table is not a physical table. If the referenced table is a physical table, then control passes to block 80 to get and/or determine at least one statistic or estimate from the physical table (e.g., the number of records of the physical table from the physical table). Practically any conventional technique may be used, such as including, but not limited to, probing the physical table.

Additionally, as probing a physical table and/or index(es) thereof and/or statistic(s) thereof typically requires time and resources, any retrieved statistics may be saved in an access plan. An access plan consistent with the invention includes but is not limited to an access plan saved in an access plan cache, an access plan stored in a permanent object, an access plan not saved in an access plan cache, an access plan not stored in a permanent object, etc. The access plan may be associated with database query1 (e.g., the access plan was previously used to execute database query1) as well as fields and/or temporary tables discussed in greater detail hereinbelow in connection with block 88. Any statistics discussed above, including a value, a cardinality of a field in a table, a number of records in the table, etc. may be saved in an access plan consistent with the invention. Thus, in future iterations, statistics may be retrieved from the access plan instead of the physical table. To ensure statistics saved in an access plan are reliable in future iterations, those of ordinary skill in the art, for example, may want to test statistics from an access plan to determine if the statistics are still representative of the data in the underlining table before relying on the statistics. After completion of block 80, control returns to block 76 to determine if there are any more table references to process for the predicate. Control may continue to return to block 76 until all the table references for the predicate have been processed.

Returning back to block 78, if the referenced table is a logical table, then control passes to block 82 to get database query2 (i.e. the database query represented by the logical table) using any conventional technique. Next, in block 84, a predicate anywhere in database query1 that references the logical table may be merged with the predicates of database query2. The predicates of query1 and query2 are referred to as a merged predicate in the specification and drawings. More than one predicate may be merged from database query1 and/or database query2. Control then passes to block 86 to determine whether or not database query2 includes a grouping operation. Generally, the keywords group by and/or distinct in a database query signal a grouping operation.

If database query2 involves grouping, control passes to block 88. Block 88 may get and/or determine a cardinality for the merged predicate from the physical table(s) the logical table is based upon. For example, if database query1 referenced logical table1.field1, the physical table the field field1 is based upon may be determined from database query2 (i.e., database query represented by the logical table). Furthermore, query2 may reference additional logical tables, thus, these additional logical tables may be accessed to determine the physical table that field field1 is based upon. Additionally, statistics may be retrieved from more than one physical table (e.g., a database query represented by a logical table may include a physical table and another logical table representing a database query which references an additional physical table).

To determine the cardinality of one or more columns of the temporary table that will be materialized from the logical table, in some embodiments, a base cardinality may be retrieved from the physical table the logical table is based upon using any conventional technique. Thus, a field that will be materialized into a temporary table during execution may be associated with a physical table if the field is based upon and/or belongs to that physical table. Similarly, a field may be associated with a logical table and/or database query represented by a logical table if the field is based upon and/or belongs to a table referenced in the logical table and/or in the database query represented by the logical table. Additionally, the base cardinality may be adjusted depending on the selectivity of the merged predicates. In some embodiments, for example, adjusting the base cardinality may entail using an index with the fields referenced in the merged predicates, column statistics for the fields referenced in the merged predicates, and/or other conventional techniques to estimate the cardinality of one or more columns of the temporary table that will be materialized from the logical table. Those of ordinary skill in the art may appreciate that a better cardinality estimate may be produced by virtue of incorporating the selectivity of the merged predicates into the cardinality estimate for the temporary table.

Once obtained, the cardinality may be saved in an access plan. The access plan, for example, may be associated with query1 (e.g., the access plan was previously utilized in executing database query1) and/or the access plan may be associated with a field that will be materialized into a temporary table (e.g., the access plan may have been used to execute database query2 of the logical table). Additionally, the cardinality may be saved in the temporary table that will be materialized for the logical table once the temporary table is materialized during query1's execution. Those of ordinary skill in the art may appreciate that statistics and/or estimates saved in a temporary table and/or access plan may be retrieved and used to generate statistics. Next, control returns to block 76 to determine if there are any more table references to process for the predicate. Control may continue to return to block 76 until all the table references for the predicate have been processed.

Returning to block 86, if there is no grouping in database query2, then control passes to block 90 to get and/or determine at least one statistic and/or estimate for the merged predicate from a physical table and/or access plan. The discussion hereinabove in connection with block 88 is applicable to block 90. After completion of block 90, control returns to block 76 to determine if there are any more table references to process for the predicate. Control may continue to return to block 76 until all the table references for the predicate have been processed.

Those of ordinary skill in the art may realize that blocks 88 and 90, for example, may be processed recursively in some embodiments due to multiple logical table references (e.g., a logical table A references a logical table B, and the logical table B references a logical table C, etc.). For example, estimates for a temporary table of logical table C and logical table B may be processed before and/or used to calculate the cardinality and/or other estimates for the temporary table of logical table A. Nonetheless, statistics may be generated for temporary tables of logical tables during optimization before the temporary tables are materialized during execution.

Once all the table references in the predicate of database query1 are processed, control passes to block 92. As there may be many estimates, including cardinality estimates and/or other statistical data that may have been generated to optimize database query1, block 92 determines the selectivity of the predicate using the statistical information. For example, based upon the cardinality of the tables referenced in the predicate, the selectivity of the predicate may be determined using any conventional technique, such as including but not limited to inputting the cardinalities into any conventional formula for estimating the selectivity of predicate (e.g., a join predicate) known to those of ordinary skill in the art.

Next, control returns to block 74 to determine if any other predicates in database query1 need to be processed. Some or all the other predicates may have been processed in connection with block 84; thus, there may be no more predicates to process. When no more predicates in database query1 need processing, the cost of the access plan built in block 72 may be calculated in block 94 based upon the estimates gathered. Next, block 96 determines if more access plans should be built. Each table reference generally increases the number of possibilities (e.g., access methods, ordering, and/or other techniques) that can be used to process a database query, in other words, the number of possible access plans increases. Thus, more access plans can be built and control returns back to block 72. On the other hand, building additional access plans may require additional time and resources; thus, the cost of the first plan may be acceptable when compared to the additional costs of building and identifying a better access plan. Conventional techniques may be used in deciding whether or not to build additional access plans. Furthermore, instead of building an access plan in block 72, a cached access plan may be used.

When all the access plans are built, control passes to block 98 to select the cheapest access plan. This step may be omitted in some embodiments if only one access plan is built. Next, database query1 is executed with the specifics (e.g., access methods, order, etc.) of the chosen access plan in block 100. During the execution of database query1, at least one temporary table may be materialized for a logical table of database query1 in block 102.

The following example illustrates the advantages of the illustrated embodiments over conventional optimization techniques. In this example, the query optimizer may receive a query such as:

```
query3: select *
    from CT_2003, CT_2004
    where CT_2003.mgrid = CT_2004.mgrid and
    CT_2003.mgrid in (173,140,132)
```

The two tables, CT_2003 and CT_2004, referenced in query3 are logical tables representing the following queries:

```
CT_2003 as (select mgrid, count(*) as count, sum(employee_sales) as
    dept_sales from Employee_2003 where status =
    'Active' group by mgrid),
CT_2004 as (select mgrid, count(*) as count, sum(employee_sales)
    as dept_sales from Employee_2004 where status =
    'Active' group by mgrid)
```

Upon receiving query3, an optimizer may request an estimate of the selectivity of predicate CT_2003.mgrid=CT_2004.mgrid. Typically, the selectivity of a predicate is based upon statistics of the tables of the predicate, in this example, statistics of CT_2003.mgrid and CT_2004.mgrid. However, logical tables CT_2003 and CT_2004 are not simple logical tables that can be merged into the database query; instead logical tables CT_2003 and CT_2004 involve complex database functionality such as grouping, and temporary tables will likely be materialized for both CT_2003 and CT_2004 during query3's execution.

Using conventional techniques, statistics may not be available during optimization for the temporary tables that will be materialized from CT_2003 and CT_2004, or if available, the statistics and/or estimates may be based upon a guess because the temporary tables do not exist during optimization. Thus, the selectivity of the CT_2003.mgrid=CT_2004.mgrid predicate may be inadequately calculated, and an optimizer may not be able to compare access plans in light of the temporary tables that will be materialized for CT_2003 and CT_2004. As a result, a suboptimal access plan may be selected under the runtime conditions.

On the other hand, consistent with the invention, statistics for temporary tables of the logical tables CT_2003 and CT_2004 may be generated during optimization. Beginning with the first predicate CT_2003.mgrid=CT_2004.mgrid and the first table reference in the predicate, CT_2003.mgrid, predicates from the query represented by CT_2003 may be merged with predicates from query3. Thus, the predicate in the query represented by CT_2003 (i.e., status='Active') may be merged with the local predicate referencing CT_2003 in query3 (i.e., CT_2003.mgrid in (173,140,132). Conventional techniques may be used to access the predicates and the query represented by CT_2003. Furthermore, upon accessing the query represented by CT_2003, conventional techniques may be used to determine that Employee_2003 is the physical table the field mgrid is based upon. Next, as the query represented by CT_2003 involves grouping, the cardinality of the temporary table that will be materialized from logical table CT_2003.mgrid will be determined, a DBMS may internally answer the following question:

--- getCardinality(Employee_2003.mgrid)
where Employee_2003.mgrid in (173, 140, 132) and
Employee_2003.status='Active'

---

Generally, a cardinality estimate may be retrieved from the physical table Employee_2003 and that estimate is adjusted to incorporate the selectivity of the merged predicates using any conventional techniques. Thus, a base cardinality may be retrieved for the field mgrid of the Employee_2003 table from physical table Employee_2003. Additionally, an index that references the mgrid and status fields, column statistics of the mgrid and status fields, and/or any other statistical information may be used to adjust the base cardinality in light of the selectivity of the local predicates (i.e., Employee_2003.mgrid in (173, 140, 132) and Employee_2003.status='Active'). Therefore, a cardinality estimate may be determined for the temporary table that will be materialized during query3's execution.

Next, a similar procedure may be used to determine the cardinality of the temporary table that will be materialized for CT_2004.mgrid. As query3 does not include any additional predicates, only the predicates in the database query represented by the CT_2004 logical table are relevant. Thus, a DBMS may internally answer the following question:

--- getCardinality(Employee_2004.mgrid)
where Employee_2004.status='Active'

---

Thus, a base cardinality may be retrieved for the field mgrid of the Employee_2004 table from physical table Employee_2004. Additionally, an index column including the mgrid and status fields, column statistic of the mgrid and status fields, and/or any other statistical information may be used to adjust the base cardinality in light of the selectivity of the local predicate Employee_2004.status='Active'. Therefore, a cardinality estimate may be determined for the temporary table that will be materialized for CT_2004 during query3's execution.

Next, for example, the cardinalities may be inputted into any conventional formula to estimate the selectivity of the join predicate (i.e., CT_2003.mgrid=CT_2004.mgrid) to determine the selectivity of the join predicate. Then, the optimizer may be able to estimate the cost of different access plans. In particular, the optimizer may estimate the cost of the different access plans based upon the cost of different access methods and join orders possible to execute query3. Thus, an optimal access plan may be selected to execute query3 using statistics for the temporary tables that do not exist during optimization, and the temporary tables for CT_2003.mgrid and CT_2004.mgrid will be materialized during execution of query3.

Those of ordinary skill in the art may appreciate that even though temporary tables for CT_2003 and CT_2004 will not be materialized until query3 executes, statistics for the temporary tables of these two logical tables may be generated. Furthermore, the query optimizer may now possess information about the number of rows or records that may be accessed and selected from CT_2003 and CT_2004 as well as the selectivity of the join predicate.

Various modifications may be made to the illustrated embodiments without departing from the spirit and scope of the invention. Furthermore, any examples used in describing any of the illustrated embodiments are not meant to limit the invention. Therefore, the invention lies in the claims hereinafter appended.

What is claimed is:

1. A method of optimizing a database query, the method comprising:
   receiving a first database query where at least one field is materialized into a first temporary table during execution of the first database query, wherein the field is associated with a second database query;
   merging at least one predicate from the first database query with at least one predicate from the second database query;
   generating a first statistic for the first temporary table prior to creation of the first temporary table based upon the merged predicates from the first and second database queries, wherein the first statistic includes a cardinality for at least one column of the first temporary table; and
   optimizing the first database query using the first statistic.

2. The method of claim 1, wherein the second database query is at least one abstraction away from a physical table associated with the second database query.

3. The method of claim 1, wherein the first statistic includes at least one of a selectivity of a predicate, a cardinality of a field, a number of records in a table, a number of distinct values, a number of records selected, a number of bytes, a frequent value list, a histogram, a distribution, a predicate, a record, a field, or a value.

4. The method of claim 1, wherein generating the first statistic includes using a physical table associated with the field.

5. The method of claim 1, wherein generating the first statistic includes using an access plan associated with the field.

6. The method of claim 1, wherein generating the first statistic includes using a second statistic of a second temporary table.

7. The method of claim 1, further comprising using the first statistic to generate a second statistic for a second temporary table.

8. The method of claim 1, further comprising saving the first statistic in at least one of the first temporary table or an access plan.

9. The method of claim 1, wherein the first database query references at least one logical table, and wherein the at least one field is a field of the logical table.

* * * * *